(12) United States Patent
Liu et al.

(10) Patent No.: US 10,773,209 B2
(45) Date of Patent: Sep. 15, 2020

(54) AGING-RESISTANT CATALYST ARTICLE FOR INTERNAL COMBUSTION ENGINES

(75) Inventors: Xinsheng Liu, Edison, NJ (US); Ye Liu, Holmdel, NJ (US); Pascaline Harrison Tran, Holmdel, NJ (US); Michael P. Galligan, Cranford, NJ (US); Wenyong Lin, Edison, NJ (US); Keshavaraja Alive, South Plainfield, NJ (US)

(73) Assignee: BASF Corporation, Florham Park, NJ (US)

( * ) Notice: Subject to any disclaimer, the term of this patent is extended or adjusted under 35 U.S.C. 154(b) by 2245 days.

(21) Appl. No.: 12/706,742

(22) Filed: Feb. 17, 2010

(65) Prior Publication Data

US 2010/0215557 A1  Aug. 26, 2010

Related U.S. Application Data

(60) Provisional application No. 61/154,053, filed on Feb. 20, 2009.

(51) Int. Cl.
| | |
|---|---|
| *B01D 53/94* | (2006.01) |
| *B01J 35/04* | (2006.01) |
| *B01J 37/02* | (2006.01) |
| *B01J 23/63* | (2006.01) |

(52) U.S. Cl.
CPC ............ *B01D 53/945* (2013.01); *B01J 23/63* (2013.01); *B01J 35/04* (2013.01); *B01J 37/0207* (2013.01); *B01J 37/0225* (2013.01); *B01J 37/0242* (2013.01); *B01J 37/0244* (2013.01); *B01J 37/0248* (2013.01); *B01D 2255/1021* (2013.01); *B01D 2255/1023* (2013.01); *B01D 2255/1025* (2013.01); *B01D 2255/206* (2013.01); *B01D 2255/20715* (2013.01); *B01D 2255/908* (2013.01); *B01D 2255/9022* (2013.01); *F01N 2510/0684* (2013.01); *F01N 2570/14* (2013.01); *F01N 2590/06* (2013.01); *Y02A 50/2344* (2018.01); *Y02T 10/22* (2013.01)

(58) Field of Classification Search
CPC ......... B01D 53/945; B01J 23/63; B01J 35/04; B01J 37/0207; B01J 37/0225; B01J 37/0242; B01J 37/0244; B01J 37/0248
See application file for complete search history.

(56) References Cited

U.S. PATENT DOCUMENTS

| | | | |
|---|---|---|---|
| 5,000,929 A | 3/1991 | Horiuchi et al. | |
| 5,116,800 A | 5/1992 | Williamson et al. | |
| 5,130,109 A | 7/1992 | Wan | |
| 5,275,997 A | 1/1994 | Ganguli et al. | |
| 5,948,723 A * | 9/1999 | Sung ............................. | 502/303 |
| 6,087,298 A | 7/2000 | Sung et al. | |
| 2003/0004060 A1* | 1/2003 | Shigapov et al. ............ | 502/304 |
| 2003/0021745 A1 | 1/2003 | Chen | |
| 2003/0061860 A1* | 4/2003 | Hu et al. ...................... | 73/23.31 |
| 2005/0070428 A1 | 3/2005 | Kawamoto et al. | |
| 2005/0227867 A1 | 10/2005 | Chen et al. | |
| 2006/0217263 A1* | 9/2006 | Kawamoto et al. .......... | 502/304 |
| 2007/0191219 A1 | 8/2007 | Fujita et al. | |
| 2008/0020925 A1 | 1/2008 | Larcher et al. | |
| 2008/0045404 A1 | 2/2008 | Han et al. | |
| 2008/0072578 A1 | 3/2008 | Kumar | |
| 2008/0187476 A1 | 8/2008 | Larcher et al. | |
| 2008/0207438 A1 | 8/2008 | Suzuki et al. | |
| 2009/0022641 A1 | 1/2009 | Chen et al. | |

FOREIGN PATENT DOCUMENTS

| | | | | |
|---|---|---|---|---|
| CN | 101362091 A * | 2/2009 | ............. | B01J 23/66 |
| EP | 0 665 047 | 8/1995 | | |
| EP | 0 808 800 A2 | 11/1997 | | |
| EP | 0808800 A2 * | 11/1997 | ............. | C01G 25/02 |
| JP | 62-136244 | 6/1987 | | |
| JP | 2000-262898 | 9/2000 | | |
| JP | 2006-68728 | 3/2006 | | |
| JP | 2006-240974 | 9/2006 | | |
| JP | 2006-263581 | 10/2006 | | |
| JP | 2007-83224 | 4/2007 | | |
| WO | WO 95/35152 | 12/1995 | | |

OTHER PUBLICATIONS

Yao et al (Mesoporous structure of praseodymium-stabilized zirconia, Mat Lett 61 (2007) 192-195).*

* cited by examiner

*Primary Examiner* — Patricia L. Hailey
*Assistant Examiner* — Michael Forrest
(74) *Attorney, Agent, or Firm* — Womble Bond Dickinson (US) LLP

(57) ABSTRACT

Catalyst articles comprising palladium and related methods of preparation and use are disclosed. Disclosed is a catalyst article comprising a first catalytic layer formed on a substrate, wherein the first catalytic layer comprises palladium impregnated on a ceria-free oxygen storage component and platinum impregnated on a refractory metal oxide, and a second catalytic layer formed on the first catalytic layer comprising platinum impregnated on an oxygen storage component and rhodium impregnated on a zirconia-coated or yttria-coated alumina. The palladium component of the catalyst article is present in a higher proportion relative to the other platinum group metal components. The catalyst articles provide improved reductions in NOx in exhaust gases, particularly after lean-rich aging.

10 Claims, 1 Drawing Sheet

AGING-RESISTANT CATALYST ARTICLE FOR INTERNAL COMBUSTION ENGINES

CROSS REFERENCE TO RELATED APPLICATIONS

This application claims the benefit of priority under 35 USC § 119(e) to U.S. Provisional Application Ser. No. 61/154,053, filed Feb. 20, 2009, which is incorporated herein by reference.

TECHNICAL FIELD

This invention pertains to catalyst articles useful for treatment of gaseous streams containing hydrocarbons, carbon monoxide and nitrogen oxides, methods of using the catalyst articles to treat the gaseous streams and methods of making the catalyst articles. More particularly, the invention provides catalyst articles and methods for treatment of exhaust produced by internal combustion engines.

BACKGROUND

The exhaust gases of internal combustion engines contain pollutants such as hydrocarbons, carbon monoxide and nitrogen oxides ($NO_x$) that foul the air. Emission standards for unburned hydrocarbons, carbon monoxide and nitrogen oxide contaminants have been set by various governments and must be met by older as well as new vehicles. In order to meet such standards, catalytic converters containing a three way catalyst (TWC) may be located in the exhaust gas line of internal combustion engines. The use of exhaust gas catalysts have contributed to a significant improvement in air quality. The TWC is the most commonly used catalyst and it provides the three functions of oxidation of CO, oxidation of unburned hydrocarbons (HC's) and reduction of NOx to $N_2$. TWCs typically utilize one or more platinum group metals (PGM) to simultaneously oxidize CO and HC and reduce NOx compounds. The most common catalytic components of a TWC are platinum (Pt), rhodium (Rh) and palladium (Pd).

TWC catalysts perform best when the engine operates at or close to stoichiometric conditions (air/fuel ratio, $\lambda=1$). In actual use, however, engines must operate on either side of $\lambda=1$ at various stages during an operating cycle. For example, under rich operating conditions such as during acceleration, the exhaust gas composition is reductive and it is more difficult to carry out oxidation reactions on the catalyst surface. For this reason, TWC's have been developed to incorporate a component which stores oxygen during lean portions of the operating cycle and releases oxygen during rich portions of the operating cycle. This component is ceria-based in most commercial TWC's. Unfortunately, when ceria is doped with precious metal catalysts such as Pd it tends to lose surface area when exposed to high temperatures, e.g. 800° C. or above, and the overall performance of the catalyst is degraded. TWC's have therefore been developed which use ceria-zirconia mixed oxides as the oxygen storage component, as the mixed oxides are more stable to loss of surface area than ceria alone. TWC catalysts are generally formulated as washcoat compositions containing supports, oxygen storage components and PGMs. Such catalysts are designed to be effective over a specific range of operating conditions which are both lean and rich as compared to stoichiometric conditions.

Small internal combustion engines, usually two-stroke and four-stroke spark ignition engines, are used to provide power to a variety of machinery, e.g. gasoline-engine powered lawn mowers, chain saws, leaf blowers, string cutters, motor scooters, motorcycles, mopeds and the like. Such engines provide a particularly severe environment for catalytic exhaust treatment. This is because small engines operate at high temperatures and the exhaust gas contains a high concentration of unburned fuel and unconsumed oxygen.

The platinum group metals in the TWC catalysts (e.g., platinum, palladium, rhodium, rhenium and iridium) are typically disposed on a high surface area, refractory metal oxide support, e.g., a high surface area alumina coating, or on an oxygen storage component. The support is carried on a suitable carrier or substrate such as a monolithic substrate comprising a refractory ceramic or metal honeycomb structure, or refractory particles such as spheres or short, extruded segments of a suitable refractory material. The TWC catalyst substrate may also be a wire mesh, typically a metal wire mesh, which is particularly useful in small engines.

Refractory metal oxides such as alumina, bulk ceria, zirconia, alpha alumina and other materials may be used as supports for the catalytic components of a catalyst article. The alumina support materials, also referred to as "gamma alumina" or "activated alumina," typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Although many of the other refractory metal oxide supports suffer from the disadvantage of having a considerably lower BET surface area than activated alumina, that disadvantage tends to be offset by a greater durability of the resulting catalyst. Oxygen storage components, such as discussed above, may also be used as supports for the PGM components of the TWC.

In an operating engine, exhaust gas temperatures can reach 1000° C., and such elevated temperatures cause the activated alumina or other support material to undergo thermal degradation caused by a phase transition with accompanying volume shrinkage, especially in the presence of steam, whereby the catalytic metal becomes occluded in the shrunken support medium with a loss of exposed catalyst surface area and a corresponding decrease in catalytic activity. Alumina supports may be stabilized against such thermal degradation by the use of materials such as zirconia, titania, alkaline earth metal oxides such as baria, calcia or strontia or rare earth metal oxides, such as ceria, lanthana and mixtures of two or more rare earth metal oxides.

Automotive catalyst stability is tested in the laboratory by exposing the catalyst to accelerated aging under laboratory conditions in different atmospheres. These testing protocols mimic operating conditions in the engine, including high temperature and lean/rich perturbations in the exhaust. Such tests typically include high temperature in the presence or absence of water. Two types of accelerated aging protocols are steam/air (oxidative hydrothermal aging, simulating lean operating conditions) or aging under nitrogen, argon or hydrogen (inert aging, simulating rich operating conditions). Although testing under both of these catalyst aging conditions provides better reproduction of catalyst performance in actual use in the engine environment, most attention in the field has been paid to developing catalysts that survive high temperature steam/air aging conditions. Little work has been done to address catalyst stability under high temperature rich aging. Current catalyst technology exhibits significant catalyst deactivation under rich aging conditions, particularly when exposed in sequence to both the steam/air protocol and high temperature rich aging protocols.

There is a need for a palladium-containing catalyst article with reduced proportions of platinum and/or rhodium relative to palladium and improved performance and stability, under both lean and rich aging conditions. The present invention addresses this need.

SUMMARY

An embodiment of the present invention is directed to a high-palladium catalyst article and related methods of preparation and use. The catalyst article may comprise an optional etch coat layer formed on a substrate, wherein the first layer comprises a refractory metal oxide and has a surface that is substantially uniform. A first catalytic layer is formed on the etch coat layer (if present) or on the carrier substrate (if the etch coat layer is not present), wherein the first catalytic layer comprises i) platinum and palladium impregnated on a refractory metal oxide support and palladium impregnated on a ceria-free oxygen storage component. The ceria-free oxygen storage component may be a composite of zirconia and a rare earth metal oxide other than ceria, for example praseodymia, neodymia or lanthana. A second catalytic layer is formed on the first catalytic layer, wherein the second catalytic layer comprises platinum and rhodium, and at least the rhodium component is impregnated on a zirconia-coated or yttria-coated refractory metal oxide support. An oxygen storage component may also be present in the second catalytic layer. In one embodiment, the catalyst article exhibits improved durability and performance relative to known TWC catalyst articles, particularly in its stability under rich operating conditions. The substrate of the catalyst article may typically be a honeycomb structure.

In another aspect of the invention, the high-palladium catalyst article is made by optionally coating on a substrate an etch coat layer comprising a refractory metal oxide in an acidic sol, drying the first layer using heat and airflow such that a substantially uniform surface is formed on the etch coat layer, depositing a first catalytic layer on the etch coat layer by coating a slurry on the etch coat layer (if present) or on the substrate (if the etch coat layer is not present), the slurry comprising 1) a ceria-free oxygen storage component impregnated with palladium and 2) platinum impregnated on a refractory metal oxide support, and drying the first catalytic layer. A portion of the palladium in the first catalytic layer may also be impregnated on the refractory metal oxide support. The ceria-free oxygen storage component of the first catalytic layer may be a composite of zirconia and a rare earth metal oxide other than ceria, for example praseodymia, neodymia or lanthana. A second catalytic layer is deposited on the first catalytic layer by coating a slurry on the first catalytic layer, the slurry comprising an oxygen storage component, platinum and rhodium, wherein the rhodium component is impregnated on a zirconia-coated or yttrium-coated refractory metal oxide support, and drying the second catalytic layer.

The catalyst articles of the invention are particularly useful for treating exhaust produced by internal combustion engines, where lean/rich fluctuations in operating conditions produce high variation in exhaust contaminants that must be removed. The catalyst articles of the invention exhibit substantially less deterioration relative to performance of the fresh catalyst under such operating conditions.

DETAILED DESCRIPTION

Figure 1:
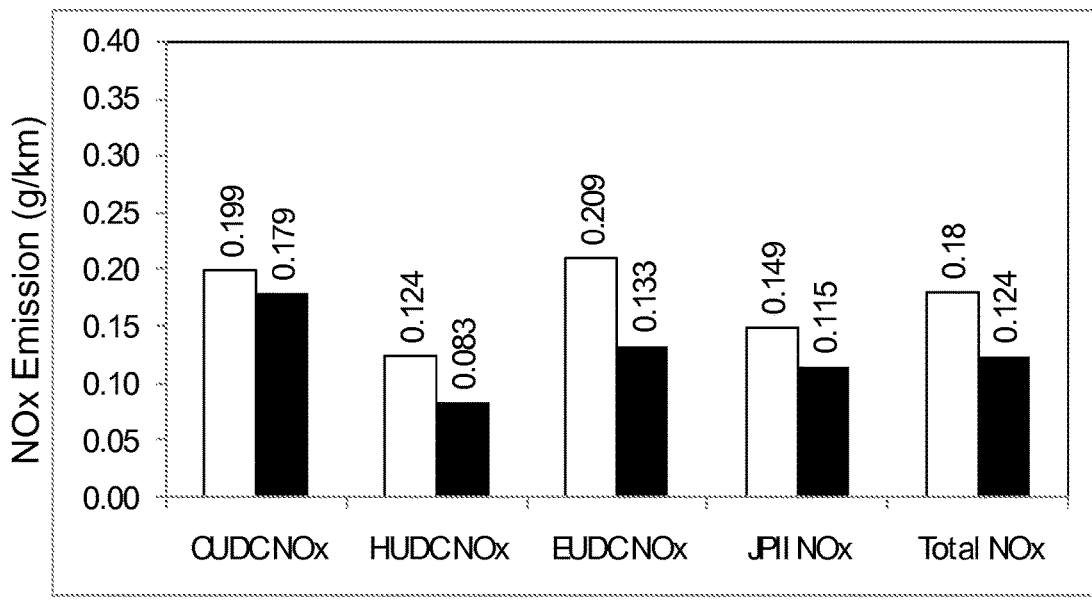
FIG. 1 is a bar graph showing the results of Example 2, comparing NOx emissions for a conventional catalyst and a catalyst according to the invention in different drive cycles. Data represent the average of two experimental runs.

The present invention relates to catalyst articles, components of catalyst articles, methods of using the catalyst articles and methods of making the catalyst articles generally referred to as a three-way conversion catalyst having the capability of simultaneously catalyzing the oxidation of hydrocarbons and carbon monoxide and the reduction of nitrogen oxides. The catalyst article according to an embodiment of the invention comprises at least two washcoat layers. It has been found that substantially improved performance under rich operating conditions is achieved by providing two catalyst-containing layers on a substrate, wherein the first catalytic layer comprises a high level of palladium relative to platinum and rhodium. In the first catalytic layer, the palladium component is supported on a ceria-free oxygen storage component. A portion of the palladium may also be supported on a refractory metal oxide. The platinum component of the first catalytic layer is supported on a refractory metal oxide; however, a portion of the platinum component may also be supported on the ceria-free oxygen storage component. The second catalytic layer comprises rhodium supported on a zirconia-coated or yttria-coated refractory metal oxide and platinum stabilized with an oxygen storage component.

As used herein, the term "high-palladium" with reference to a catalyst article or a layer of a catalyst article means the content of palladium by weight in the article or layer is higher than the content by weight of non-palladium platinum group metal (PGM) components in the article or layer. Preferably, the palladium content is higher than each of the non-palladium PGM components. More preferably, the palladium content is higher than the total content of all non-palladium PGM components. In one aspect, the palladium content may be 10-30 fold higher than the total non-palladium PGM content of the catalyst article. Typically, the total PGM content of the catalyst article is 30-100 g/ft$^3$, 50-80 g/ft$^3$, or about 75 g/ft$^3$.

As used herein, the term "substantially uniform" with respect to a layer of the catalyst article means the surface of the layer is free of defects over at least about 90% of the total surface area. The substantially uniform surface exhibits no more than about 10% of the total surface area of the layer of cracks, fissures or flaking of the surface of the layer. In certain aspects of the invention, the surface of the layer is at least about 95% defect-free, and in a detailed aspect of the invention it is 100% defect-free. Evaluation of the uniformity of the surface of the layer is readily performed using procedures known in the art, including metallography, scanning electron microscopy, transmission electron microscopy (TEM) and direct visual inspection of the surface of the layer using, for example, a conventional light microscope.

As used herein, the term "support" with respect to a catalytic layer refers to a material that receives platinum group metals, stabilizers, promoters, binders, and the like through association, dispersion, impregnation, or other suitable methods. Examples of supports include, but are not limited to, refractory metal oxides, high surface area refractory metal oxides and materials containing oxygen storage components. One or more embodiments of the present invention include a high surface area refractory metal oxide support comprising an activated compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria. Examples of materials containing oxygen storage components include, but are not limited to, ceria-zirconia, ceria-zirconia-lanthana, zirconia-praseodymia, yttria-zirconia, zirconia-neodymia and zirconia-lanthana. Reference to a "rare earth metal oxide-zirconia composite" means a composite comprising a rare earth metal oxide and zirconia, without specifying the amount of either component. Suitable rare earth metal oxide-zirconia materials include, but are not limited to, materials having, for example, between 5% and 95% of rare earth metal content. In certain embodiments, the support comprises bulk rare earth metal oxide having a nominal rare earth metal content of 100% (i.e., >99% purity).

As used herein, the term "oxygen storage component" (OSC) refers to an entity that has multi-valence state and can actively react with oxidants such as oxygen or nitrous oxides under oxidative conditions, or with reductants such as carbon monoxide (CO) or hydrogen under reduction conditions. Examples of suitable oxygen storage components include ceria and praseodymia. Delivery of an OSC to the layer can be achieved by the use of, for example, mixed oxides. For example, ceria can be delivered by a mixed oxide of cerium and zirconium, and/or a mixed oxide of cerium, zirconium, and neodymium. For example, praseodymia can be delivered by a mixed oxide of praseodymium and zirconium, and/or a mixed oxide of praseodymium, cerium, lanthanum, yttrium, zirconium, and neodymium.

As used herein, the term "ceria-free oxygen storage component" or "ceria-free OSC" refers to an OSC which contains less than 1% ceria, preferably less than 0.5% ceria, and most preferably essentially 0% ceria. Examples of ceria-free OSCs include zirconia-praseodymia, zirconia-neodymia, zirconia-yttria and zirconia-lanthana.

As used herein, the term "impregnated" means that a platinum group metal-containing solution is put into pores of a support. In detailed embodiments, impregnation of platinum group metals is achieved by incipient wetness, where a volume of diluted platinum group metal is approximately equal to the pore volume of the support bodies. Incipient wetness impregnation generally leads to a substantially uniform distribution of the solution of the precursor throughout the pore system of the support.

As used herein, the term "component" in connection with a platinum group metal means any compound, complex, or the like which, upon calcination or use thereof, decomposes or otherwise converts to a catalytically active form of the platinum group metal, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the platinum group metals are utilized. For example, suitable compounds include palladium nitrate. During the calcination step, or at least during the initial phase of use of the composite, such compounds are converted into a catalytically active form of the metal or a compound thereof.

In a first aspect, the catalyst article of the invention is a high-palladium article comprising: a first catalytic layer on a suitable substrate, the catalytic layer comprising a high level of a palladium. All palladium components present in the catalyst article are contained in the first catalytic layer. A portion of the palladium component in the first catalytic layer may be supported on a refractory metal oxide support, preferably a high surface area refractory metal oxide support. The remaining portion of the palladium component in the first catalytic layer is supported on a ceria-free oxygen storage component, preferably zirconia doped with praseodymia, lanthana, neodymia, yttria or a mixture thereof. Alternatively, all of the palladium may be supported on the ceria-free oxygen storage component. The first catalytic layer further comprises a platinum component supported on a refractory metal oxide, which may be an alumina-containing support. The first catalytic layer is coated with a second catalytic layer comprising a rhodium component supported on a zirconia-coated or yttria-coated refractory metal oxide and a platinum component stabilized with an oxygen storage component. There is no palladium component in the second catalytic layer.

In a further aspect, the OSC of the first catalytic layer is a praseodymia-zirconia composite, an yttria-zirconia composite, a neodymia-zirconia composite or a lanthana-zirconia composite wherein the rare earth component of the composite represents about 1-40% by weight. In the second catalytic layer the composite may comprise any of the rare earth metal oxides in a composite with zirconia. The composite may be prepared using methods known in the art, including co-precipitation, sol gels and mixing of the rare earth metal oxide with zirconia. The presence of the rare earth metal oxide in the composite imparts improved thermal stability to the zirconia component.

Another aspect of the invention provides that the palladium component of the catalyst article is present by weight in amounts higher than either or both of the platinum component and the rhodium component. The ratio of platinum to palladium to rhodium by weight may be 0.5-10/1-80/0.5-10, 1-5/30-50/1-5 or about 1/40/2.4, respectively. That is, in a specific embodiment, the palladium content of the catalyst article is about 40 times the platinum content and about 16-20 times the rhodium content. In a further specific embodiment the Pt/Pd/Rh ratio by weight is 3/7/1, 2/14/1, 1/25/2, 1/40/2 or 1/60/2.

Other aspects of the invention provide that the second catalytic layer comprises a refractory metal oxide, such as a high surface area refractory metal oxide, on which the platinum and rhodium components are supported. In one or more embodiments, the refractory metal oxide comprises an activated compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria. In the second catalytic layer, when the refractory metal oxide contains alumina and is used as a support for the rhodium component, it is coated with zirconia or yttria to inhibit reaction of the alumina with the rhodium component and formation of aluminum rhodate. At least the rhodium component is substantially entirely supported on the coated alumina. However, the platinum component is preferably supported on and stabilized by an OSC which in this case need not be ceria-free, for example ceria-zirconia.

Zirconia-coated alumina for use in the present invention as a support for rhodium in the second catalytic layer may be prepared according any of the methods known in the art. These include, for example, introduction of zirconium n-propoxide in n-propanol to a calcined alumina support as described by S. Damyanova, et al. Journal of Catalysis 168, 421-430 (1997), or impregnation of alumina powder using a nitric acid solution of zirconium hydroxide as described by M. M. V. M. Souza, et al. Phys. Stat. Sol. (a) 187, No. 1, 297-303 (2001).

In a further aspect of the invention, either the first catalytic layer or the second catalytic layer or both may further comprise a promoter selected from the group consisting of BaO, SrO, $La_2O_3$, $Nd_2O_3$, $Pr_6O_{11}$, $Y_2O_3$, $Sm_2O_3$, and combinations thereof.

Other aspects of the invention provide methods for treating a gas comprising hydrocarbons, carbon monoxide, and nitrogen oxides, the method comprising: contacting the gas in an exhaust stream of a gasoline engine with a catalytic material on a substrate, the catalytic material comprising the two catalytic layers described herein, with or without an optional etch coat layer underlying the first catalytic layer, such that hydrocarbon, carbon monoxide and NOx in the exhaust stream are reduced. In particular, NOx in the exhaust stream is substantially reduced by the catalyst articles of the invention as compared to catalyst articles wherein palladium is supported on a ceria-containing OSC.

One aspect of the invention provides a catalyst article comprising: a catalytic material on a substrate, the catalytic material comprising the two catalytic layers described herein and the catalyst article further comprising an etch coat layer between the substrate and the first catalytic layer. The etch coat layer comprises a high surface area refractory metal oxide and is preferably prepared such that the surface is substantially uniform. A substantially uniform surface on the etch coat provides improved bonding of the first catalytic layer to the substrate and is particularly advantageous when the catalyst article is used in high-vibration environments such as small engines. Fast and thorough drying of the etch coat facilitates production of the substantially uniform surface and may be achieved by drying the layer at lower temperatures under moving air. Thorough drying of the etch coat also contributes to achievement of an even distribution of the palladium component in the first catalytic layer.

In one embodiment, significant improvement in the reduction of NOx emissions from a small gasoline engine can be obtained using the catalyst articles of the invention. Improvement in hydrocarbon and carbon monoxide emissions may also be achieved. The catalyst articles of the invention also exhibit substantially improved performance in sequential lean-rich aging test protocols.

In detailed aspects, the ceria-free oxygen storage component is typically present in the first catalytic layer in an amount of 10-60%, 30-50% or 40-50% by weight of the components of the first catalytic layer. The oxygen storage component in the second catalytic layer is typically present in an amount of 20-80%, 30-70% or 40-60% by weight of the components of the second catalytic layer.

One or more embodiments provide that the PGM components are present in an amount of about 10-150 $g/ft^3$, about 20-100 $g/ft^3$, or about 25-80 $g/ft^3$. In a specific embodiment, the PGM components are present in an amount of about 75 $g/ft^3$ in the catalyst article. It will be understood that the content of each PGM in the catalyst article, and therefore their relative weight ratios, may be varied to achieve the desired total PGM content. It is generally preferred that palladium be present in higher amounts relative to platinum and rhodium to reduce the cost, however this is not required for the function of the catalyst article. Typically, platinum is present at 1-90 $g/ft^3$, palladium is present at 1-90 $g/ft^3$, and rhodium is present at 1-30 $g/ft^3$. In a specific embodiment platinum is present at 1-2 $g/ft^3$, palladium is present at 40-80 $g/ft^3$ and rhodium is present at 2-5 $g/ft^3$. In further specific embodiments, total PGM is 30 $g/ft^3$ with a Pt/Pd/Rh ratio of 3/7/1, total PGM is 40 $g/ft^3$ with a Pt/Pd/Rh ration of 2/4/1, or total PGM is 100 $g/ft^3$ with a Pt/Pd/Rh ratio of 1/25/2, 1/40/2 or 1/60/2.

A detailed embodiment provides two catalytic layers on the substrate. A first catalytic layer is a high-palladium layer coated on the substrate and comprises palladium impregnated on praseodymia-doped zirconia and alumina, and platinum impregnated on alumina. The first catalytic layer is coated on the substrate and calcined. A second catalytic layer is coated on the first catalytic layer and comprises rhodium impregnated on zirconia-coated alumina and platinum impregnated on a ceria-zirconia composite. The second catalytic layer is also calcined.

A second detailed embodiment provides three layers on the substrate. A first layer coated on the substrate is an etch coat layer comprising a refractory metal oxide such as gamma alumina. The etch coat layer is coated and dried on the substrate such that its surface is substantially uniform, i.e., substantially free of defects such as cracks, fissures and flaking. In one aspect the surface of the etch coat layer is at least 90% defect-free (or about 95% or about 100% defect-free). The substantial uniformity of the etch coat layer provides excellent adherence of a first catalytic layer that is coated on the etch coat layer. The first catalytic layer comprises a ceria-free OSC support, e.g., praseodymia-doped zirconia, and a high surface area refractory metal oxide such as gamma alumina impregnated with palladium and palladium/platinum, respectively. A second catalytic layer coated on the first catalytic layer comprises platinum and/or rhodium but does not contain palladium. The second catalytic layer comprises rhodium impregnated on a zirconia-coated alumina support and platinum impregnated on a ceria-zirconia composite oxide support. The weight ratio of platinum/palladium/rhodium is typically 0.5-10/1-80/0.5-10, 1-5/2-10/1-5, 1-5/20-60/1-5 or about 1/40/2.4

In another aspect, provided is a method for treating a gas comprising hydrocarbons, carbon monoxide, and nitrogen oxides, the method comprising: contacting the gas in an exhaust stream of a gasoline engine with a catalytic material on a substrate, the catalytic material comprising two catalytic layers as described herein. Optionally, the catalytic material may further comprise an etch coat layer as described herein coated on the substrate prior to deposition of the first catalytic layer. In a further aspect, the first catalytic layer of the catalytic material is coated on an etch coat comprising a high surface area refractory metal oxide, wherein the etch coat surface is substantially uniform. According to the invention, this method is effective to remove significantly more NOx from exhaust gas than catalytic materials wherein palladium is impregnated on a ceria-containing OSC. Improved reduction in hydrocarbons and carbon monoxide in the exhaust may also be achieved using the catalyst materials of the invention.

A further aspect provides a method of making a catalyst article, the method comprising: optionally, forming an etch coat on a substrate by coating a refractory metal oxide, preferably a high surface area refractory metal oxide, on the substrate. Coating may be accomplished by any of the coating methods known in the art, such as manual dipping or airbrushing. The etch coat is subsequently dried using heat and air, preferably selecting the temperature and airflow such that a substantially uniform etch coat surface is formed. The drying temperature can be in the range of about 60-140° C. In a specific embodiment, drying of the etch coat layer is accomplished in the rage of about 70-110° C., more specifically in the range of about 80-90° C. A gentle to moderate airflow is maintained across the substrate during the drying of the etch coat, as may be provided by a conventional fan. The airflow may be provided by any suitable means, and will be determined by the size and/or configuration of the drying furnace. The etch coat layer is then calcined, typically at 490-550° C. for 1-2 hrs. The desired surface uniformity is determined by visual or microscopic methods, such as direct visualization by light microscopy, scanning electron micrographs, metallography, and the like. In a particular aspect, the etch coat is preferably thin, for example less than 10 μm in thickness. In further embodiments, the etch coat is 1-8 μm in thickness, 1-5 μm in thickness, 1-3 μm in thickness or about 1 μm in thickness. A thin etch coat and a substantially uniform etch coat surface increase adherence of the catalytic layers to the etch coat and to the substrate. The first catalytic layer is coated on the etch coat.

The first catalytic layer coating is accomplished by depositing on the etch coat a high-palladium catalytic material comprising palladium impregnated on a ceria-free, rare earth-doped zirconia support and platinum impregnated on a refractory metal oxide support. The first catalytic layer is then dried and calcined, typically at 490-550° C. for 1-2 hrs. A second catalytic layer is coated on the first catalytic layer. The second catalytic layer comprises platinum impregnated on a refractory metal oxide support and rhodium impregnated on a zirconia-coated or yttria-coated alumina support, and does not contain palladium. The rare earth component of the OSC in the first catalytic layer may be 1-40% by weight of the composite. The OSC in the second catalytic layer may be, for example, ceria-zirconia. The ratio of PGM content of the catalyst article is typically 0.5-10/1-80/0.5-10, 1-5/2-10/ 1-5. 1-5/20-60/1-5 or about 1/40/2.4 by weight (Pt/Pd/Rh).

Details of the components of a catalyst article according to the invention are provided below.

The Substrate

According to one or more embodiments, the substrate may be any of the materials typically used for preparing TWC catalysts and will preferably comprise a metal or ceramic structure. Any suitable substrate may be employed, such as a monolithic substrate of the type having a plurality of fine, parallel gas flow passages extending therethrough from an inlet or an outlet face of the substrate, such that passages are open to fluid flow therethrough. The passages, which are essentially straight paths from their fluid inlet to their fluid outlet, are defined by walls on which the catalytic material is coated as a "washcoat" so that the gases flowing through the passages contact the catalytic material. The flow passages of the monolithic substrate are thin-walled channels which can be of any suitable cross-sectional shape and size such as trapezoidal, rectangular, square, sinusoidal, hexagonal, oval, circular, etc. Such structures may contain from about 60 to about 600 or more gas inlet openings (i.e., "cells") per square inch of cross section.

The ceramic substrate may be made of any suitable refractory material, e.g., cordierite, cordierite-α alumina, silicon nitride, zircon mullite, spodumene, alumina-silica magnesia, zircon silicate, sillimanite, magnesium silicates, zircon, petalite, α-alumina, aluminosilicates and the like.

The substrates useful for the layered catalyst composites of the present invention may also be metallic in nature and be composed of one or more metals or metal alloys. The metallic substrates may be employed in various shapes such as corrugated sheet, metal plate, wire mesh or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface or the metal substrates may be oxidized at high temperatures, e.g., 1000° C. and higher, to improve the corrosion resistance of the alloy by forming an oxide layer on the surface the substrate. Such high temperature-induced oxidation may enhance the adherence of the refractory metal oxide support and catalytically-promoting metal components to the substrate.

The Catalytic Materials

The catalytic materials of the present invention are formed in two layers. The composition for each catalytic layer is prepared as a slurry of the PGM component and this slurry is used to form the layers on the substrate. The materials can readily be prepared by processes well known in the prior art. A representative process is set forth below. As used herein, the term "washcoat" has its usual meaning in the art of a thin, adherent coating of a catalytic or other material applied to a substrate carrier material, such as a honeycomb-type substrate member or wire mesh, which is sufficiently porous to permit the passage there through of the gas stream being treated.

For a first layer of a specific washcoat, finely divided particles of a high surface area refractory metal oxide such as gamma alumina, or an OSC, such as praseodymia-zirconia, are slurried in an appropriate vehicle, e.g., water. The substrate may then be dipped one or more times in such slurry or the slurry may be coated on the substrate such that there will be deposited on the substrate the desired loading of the metal oxide or OSC, e.g., about 0.5 to about 2.5 g/in$^3$ per dip. To incorporate components such as platinum group metals (e.g., palladium, rhodium, platinum, and/or combinations of the same), stabilizers and/or promoters, such components may be incorporated in the slurry as a mixture of water soluble or water-dispersible compounds or complexes. Thereafter, the coated substrate is calcined by heating, e.g., at 500-600° C. for about 1 to about 3 hours. Typically, the PGM component is utilized in the form of a compound or complex to achieve dispersion of the component on the refractory metal oxide support. A suitable method of preparing any catalytic layer of the catalyst article of the invention is to prepare a mixture of a solution of a desired platinum group metal component and at least one support, such as a finely divided, high surface area, refractory metal oxide support, e.g., gamma alumina or zirconia-coated alumina, which is sufficiently dry to absorb substantially all of the solution to form a wet solid which is later combined with water to form a coatable slurry. In one or more embodiments, the slurry is acidic, having, for example, a pH of about 2 to less than about 7. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds of oxygen storage components, e.g., cerium-zirconium composite, a stabilizer, e.g., barium acetate, and a promoter, e.g., lanthanum nitrate, may be added to the slurry. Platinum group metal components may also be impregnated in the oxygen storage component, e.g., ceria-zirconia or praseodymia-doped zirconia, in a similar manner prior to addition to the slurry.

In one embodiment, the slurry is thereafter comminuted to reduce the particle size of the support. The comminution may be accomplished in a ball mill or other similar equipment, and the solids content of the slurry may be, e.g., about 20-60 wt %, more particularly about 30-40 wt %.

Additional layers, i.e., the second catalytic layer may be prepared and deposited upon the first catalytic layer in the same manner as described above for deposition of the first catalytic layer.

Before describing several exemplary embodiments of the invention, it is to be understood that the invention is not limited to the details of construction or process steps set forth in the following description. The invention is capable of other embodiments and of being practiced in various ways.

The following non-limiting examples are intended to illustrate certain embodiments of the present invention.

Example 1

A Catalyst was Prepared in the Following Manner

A cylindrical metallic honeycomb substrate was used as the carrier. The carrier had a diameter of 1.57 inches, a length of 3.54 inches and total volume of 6.9 cubic inch. The total precious metal content of the catalyst was 75 g/ft3. The precious metal component consisted of platinum, palladium and rhodium in a ratio of 1:40:2.4, respectively. The metallic carrier was pre-treated at 930° C. for 6 hours to form a thin layer of alumina on the surface.

A bottom layer (i.e., the etch coat) was applied to the surface of the carrier by immersing the carrier in an approximately 32% solid content aqueous slurry containing 408 g gamma-alumina, 55 g of alumina binder and 36 g of zirconium acetate solution and 25 g of acetic acid. The coated carrier was then calcined at 550° C. for 1 hour to obtain a dried undercoat at approximately 0.49 g/in$^3$.

A middle layer (i.e., the first catalytic layer) in the form of an aqueous solution was then applied to the surface of the carrier coated with the undercoat. The slurry used for the middle layer consisted of an approximately 40% solid content, aqueous solution containing 225 g of alumina, 228 g of Pr-doped zirconia, 30 g of barium hydroxide, 12.2 g of Pd impregnated on alumina and Pd-doped zirconia as Pd nitrate solution and 0.06 g of Pt impregnated as Pt nitrate solution. The coated carrier was then calcined at 550° C. for 1 hour to obtain a dried washcoat at approximately 1.64 g/in$^3$.

A top layer (i.e., the second catalytic layer) in the form of aqueous solution was then applied to the surface of the carried already coated with the first catalytic layer. The aqueous slurry used for the top coat contained 0.3 g of platinum impregnated as platinum nitrate solution and 0.9 g of rhodium impregnated as rhodium nitrate solution by a planetary mixture into 282 g of oxygen storage composite (Ce/Zr composite oxide) and 200 g of zirconia coated alumina. The resultant carrier was then calcined at 550° C. for 1 hour to obtain a dried washcoat at approximately 1.33 g/in$^3$.

Example 2

The catalyst of Example 1 was evaluated on a 150 cc motorcycle with electronic fuel injection in accordance with test protocol typically followed for testing a motorcycle, MVEG-MC test cycle. NOx emission data were gathered for three phases (cold start—CUDC, hot cruise—HUDC and extra urban drive cycle—EUDC) as well as for the overall test cycle followed in Japan (JP II). A conventional catalyst with similar precious metal loading and ratio but with the palladium impregnated on a ceria-containing OSC in the first catalytic layer was prepared and used for comparison. The results for NOx emissions are shown in FIG. 1. The white bars correspond to the original reference catalyst and the black bars correspond to the catalyst of the invention.

Significant improvement in NOx emission was demonstrated in all driving cycles as compared to the conventional catalyst.

Example 3

10 grams each of OSC materials with different CeO$_2$ content was used for making 1% Pd-containing OSC catalyst according to the invention. The calculated amount of Pd as an aqueous solution was added drop wise into the powder OSC material via the incipient wetness method. The impregnated samples were then dried at 110° C. in a drying oven. The catalysts were then subjected to accelerated aging in the following protocol: The dried samples were put into a muffle furnace and the temperature was ramped up to 110° C. in 30 min, held at 110° C. for 1 hr, ramped up to 550° C. in 2 hrs, held at 550° C. for 3 hrs and then the furnace was allowed to cool to room temperature. These 1% Pd—OSC catalysts were subjected to NO chemisorption followed by FT-IR spectroscopic characterization.

Figure 2:
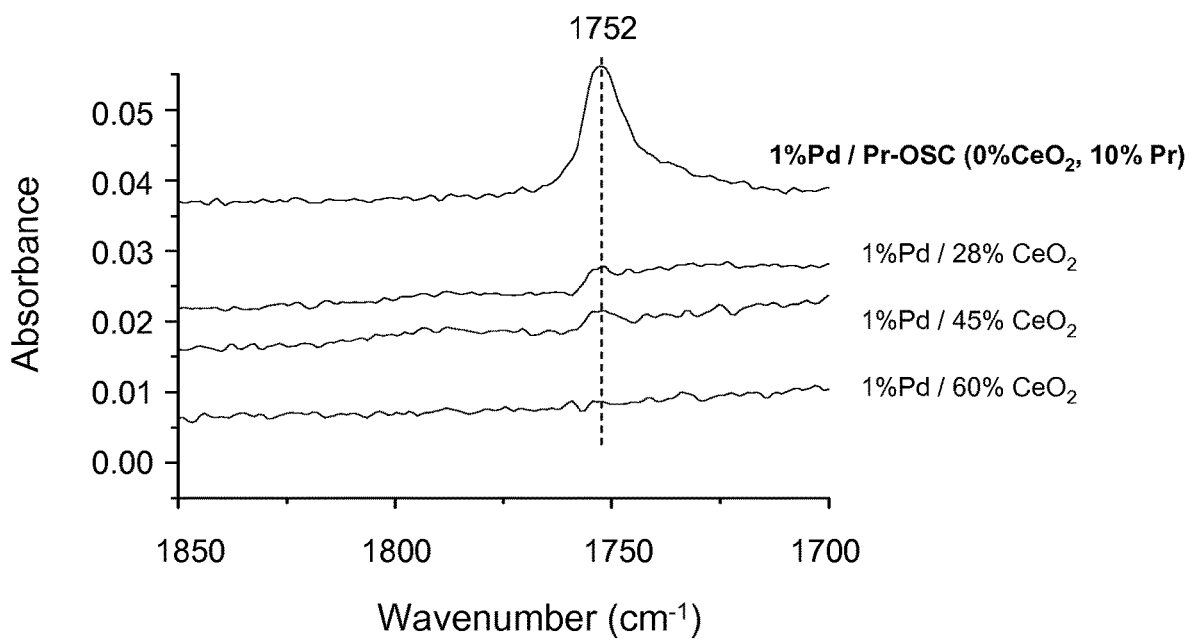
FIG. 2 is a graph showing the results of Example 3, comparing catalysts comprising different levels of ceria to the catalyst of the invention with respect to Pd metal surface availability after aging.

The results are shown in FIG. 2. The nitrogen oxide absorbance peak at 1752 cm$^{-1}$ is essentially absent in the aged catalysts containing ceria. In contrast, when ceria was replaced by praseodymia in the OSC, good correlation was established between adsorption intensity and NOx performance of the aged catalyst. These data demonstrate that the presence of ceria in the catalyst decreases the thermal stability of palladium, but that substitution of other rare-earth metals stabilizes the palladium surface against the lean and rich thermal aging.

Example 4

Performance of a catalyst article according the invention was compared to a conventional catalyst article of similar construction in which the palladium component was supported on an OSC with 45% ceria content. In laboratory reactor testing at 150,000/hr space velocity (SV) and temperature increases of 50° C./min. the inventive catalyst provided substantially higher NO and CO conversion at lower temperatures. Eighty to ninety percent NO conversion was achieved between 250° C. and 290° C. using the inventive catalyst, whereas the Ce—OSC containing catalyst achieved 80-90% NO conversion between 360° C. and 390° C. Similarly, the inventive catalyst was capable of converting 70% of CO at about 270° C. to 290° C., but the conventional catalyst achieved a maximum conversion rate of about 60% at substantially higher temperatures. These results demonstrate that the presence of ceria in the support results in deterioration of available palladium surface area.

What is claimed is:

1. A catalyst article for use in an internal combustion engine comprising:
    a first catalytic layer formed on a substrate, wherein the first catalytic layer consists of palladium impregnated on a zirconia-rare earth metal composite containing from about 1-40% by weight of a rare earth metal selected from the group consisting of praseodymia, lanthana, neodymia, yttria, and combinations thereof; platinum and optionally palladium, impregnated on alumina; and
    a second catalytic layer formed on the first catalytic layer, the second catalytic layer comprising platinum impregnated on an oxygen storage component and rhodium impregnated on zirconia-coated or yttria-coated alumina, wherein the second catalytic layer does not contain palladium, wherein the catalyst article is effective to reduce nitrogen oxides in exhaust gas from the internal combustion engine, and
    wherein the palladium content of the article is from 10 to 30-fold higher than the total platinum and rhodium content.

2. The article of claim 1 further comprising an etch coat layer on the substrate, wherein the etch coat layer underlies the first catalytic layer.

3. The article of claim 2 wherein the etch coat layer comprises a high surface area refractory metal oxide.

4. The article of claim 1 wherein the oxygen storage component of the second catalytic layer is a ceria-containing oxygen storage component.

5. A method of treating engine exhaust comprising hydrocarbons, carbon monoxide and nitrogen oxides comprising:
    contacting the exhaust with a catalyst article of claim 1, wherein the method is effective to reduce nitrogen oxides in the exhaust.

6. The method of claim 5 wherein the catalyst article further comprises an etch coat layer on the substrate, wherein the etch coat layer underlies the first catalytic layer.

7. The method of claim 5 wherein the exhaust is contacted with a catalyst article comprising a) palladium impregnated on praseodymia-doped zirconia and platinum impregnated on alumina in the first catalytic layer, and b) platinum impregnated on ceria-zirconia and rhodium impregnated on zirconia-coated alumina in the second layer.

8. The method of claim 7 wherein the ratio of platinum/palladium/rhodium is 0.5-10/1-80/0.5-10 by weight, respectively.

9. The method of claim 8 wherein the exhaust is contacted with a catalyst article comprising a total of 30-100 g/ft$^3$ of platinum group metal.

10. The method of claim 9 wherein the exhaust is contacted with a catalyst article comprising 1-90 g/ft$^3$ platinum, 1-90 g/ft$^3$ palladium and 1-30 g/ft$^3$ rhodium.

* * * * *